United States Patent Office 2,942,382
Patented June 28, 1960

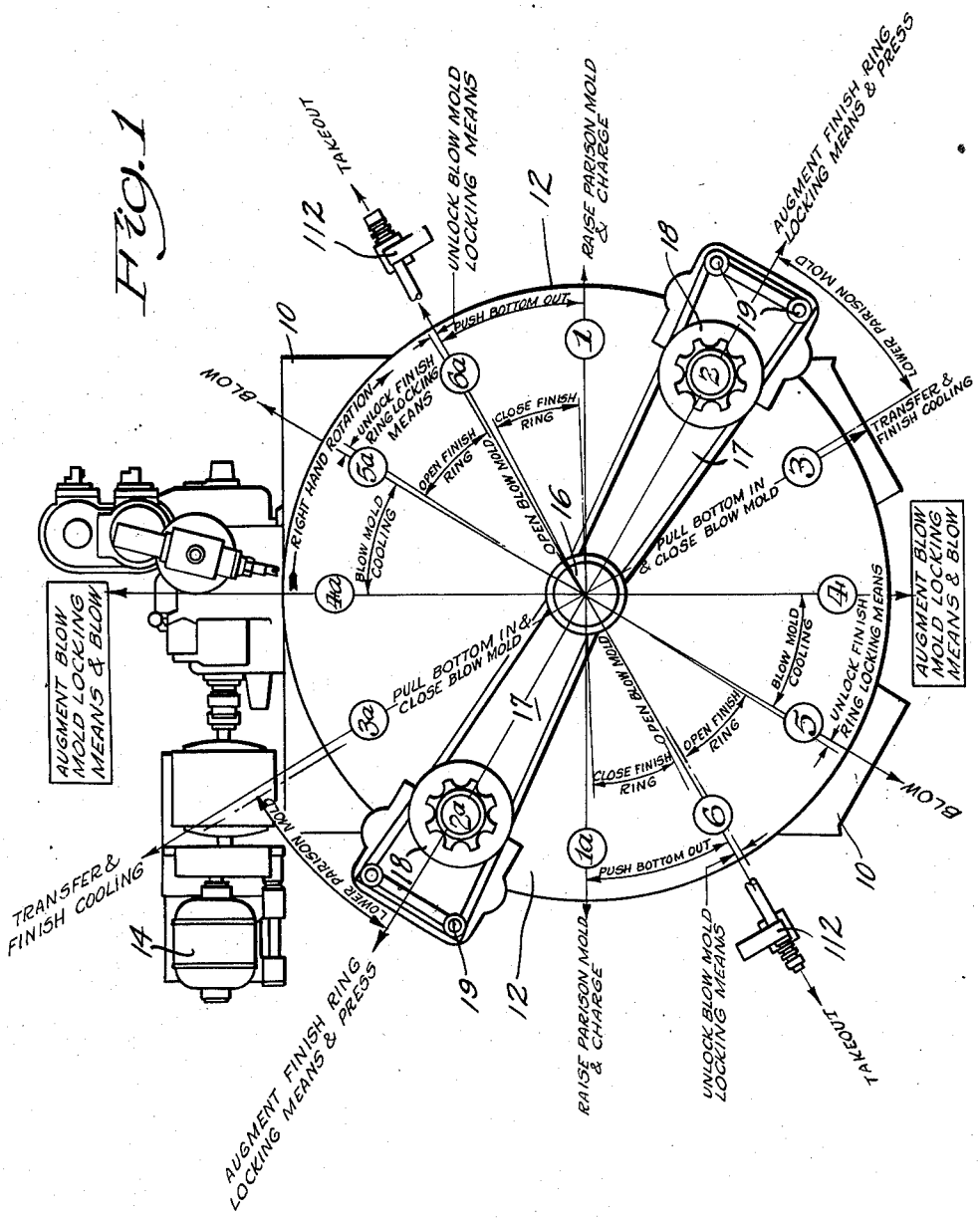

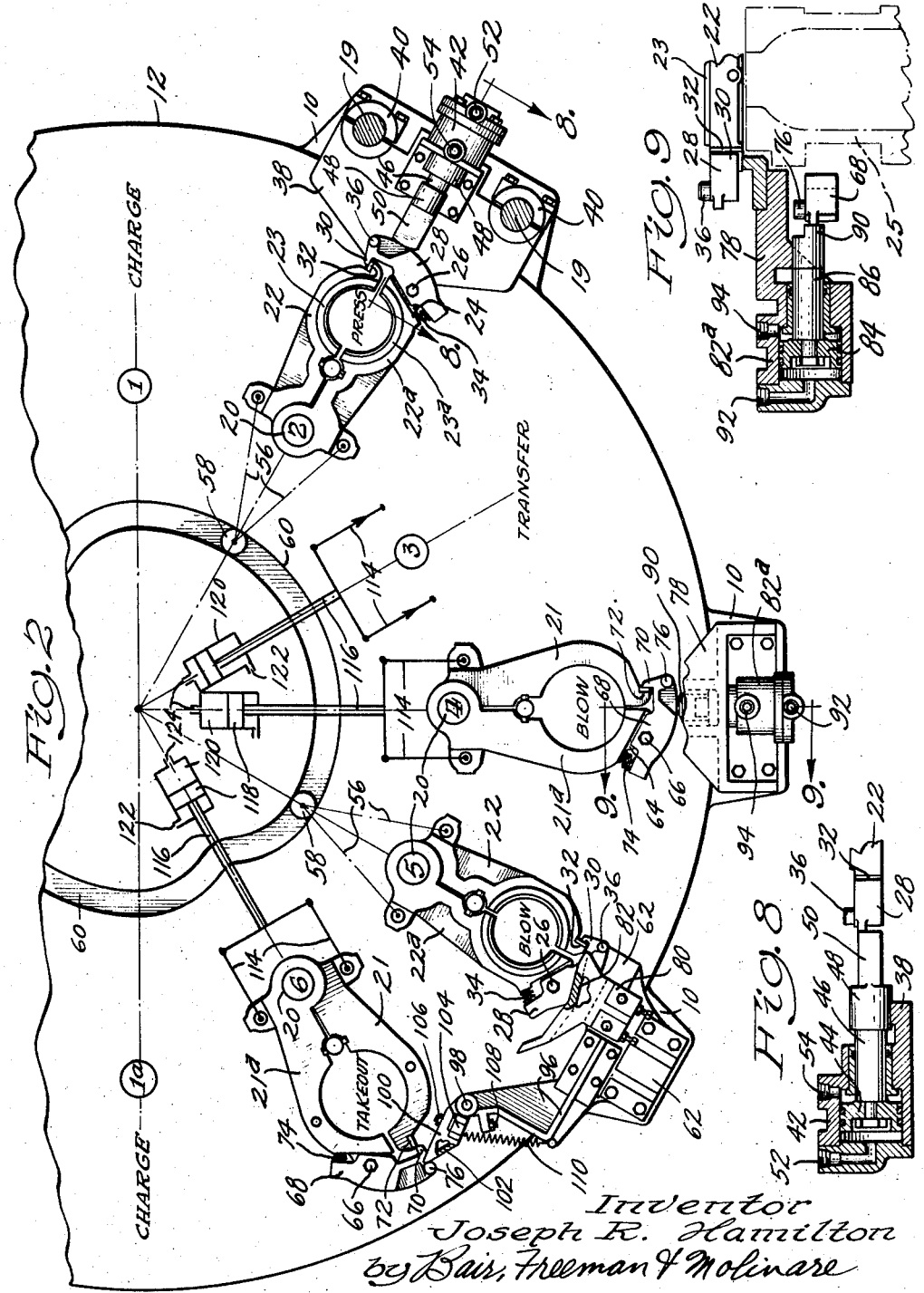

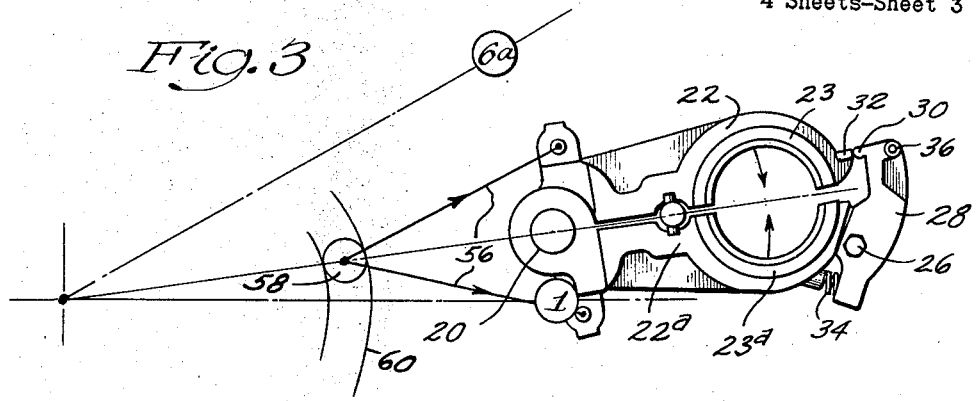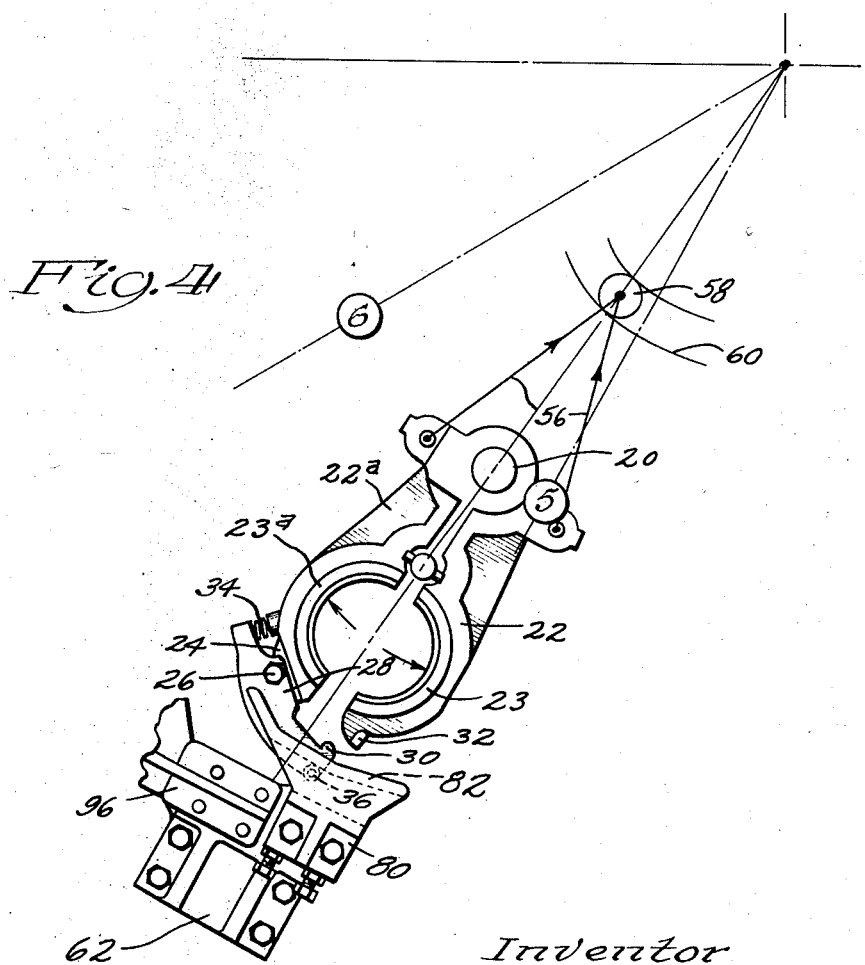

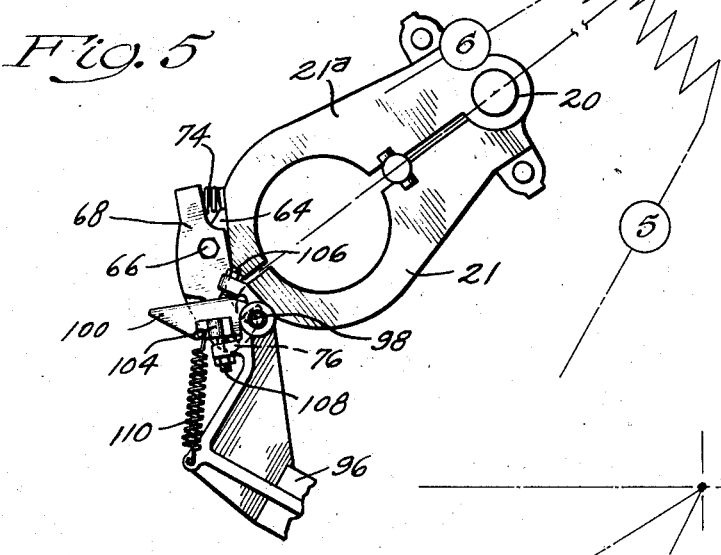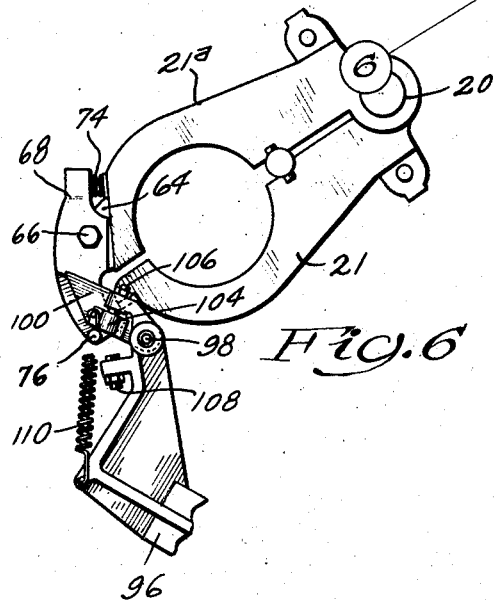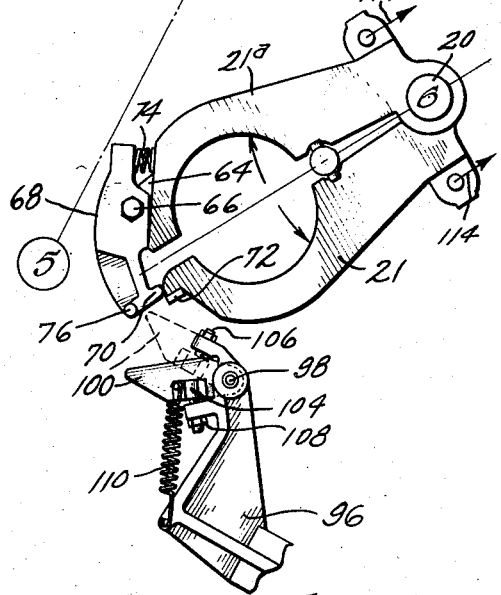

2,942,382
MOLD HOLDER AND FINISH RING HOLDER LOCKING MEANS

Joseph R. Hamilton, Anderson, Ind., assignor to Lynch Corporation, Anderson, Ind., a corporation of Indiana Filed Nov. 19, 1956, Ser. No. 622,845

11 Claims. (Cl. 49—9)

This invention relates to locking means for mold holders and finish ring holders of glassware forming machines.

One object of the invention is to provide locking means which is particularly effective to lock the mold holders and finish ring holders in their closed positions during ware forming portions of the cycle of operation of the machine, and for readily unlocking them at the proper time, all in the proper sequence during the cycle.

Another object is to provide relatively simple locking means in the form of spring closed latches for the mold and finish ring holders that automatically become effective when the holders close, auxiliary pressure being exerted on the latches at certain stations of the glassware forming machine so that their locking action is augmented by means of power-operated mechanisms at those stations.

A further object is to provide stationary cam means cooperable with the latches for releasing them during the intermittent rotation of a table on which the mold holders and finish ring holders are carried so that adjacent one station of the machine the finish ring holders are unlocked to permit the finish rings to be subsequently opened for engagement of a take-out with the finish of the ware, and adjacent another station of the machine the blow mold holders are unlocked so that the mold holders and thereby the molds can be opened for permitting take-out.

Still a further object is to provide the cam for unlocking the blow mold holder locking means pivoted for swinging out of the way to clear the take-out mechanism as it removes the finished ware from the machine.

With these and other objects in view, my invention consists in the construction, arrangement and combination of the various parts of my mold holder and finish ring holder locking means, whereby the objects above contemplated are attained, as hereinafter more fully set forth, pointed out in my claims and illustrated in detail on the accompanying drawings wherein:

Fig. 1 is a plan view of a glassware forming machine of the "press and blow" type and includes diagrammatically the 12 stations of the machine with legends lettered annularly referring to operations that take place while the table of the machine is intermittently rotating and other legends lettered radially indicating operations that take place at the various stations of the machine and during the time the table is stationary;

Fig. 2 is an enlarged plan view of stations 1 to 6 and 1a showing in detail only the finish ring holder and its locking mechanism at station 2 and being unlocked at station 5, and only the blow mold holder and its locking mechanism at station 4 and being unlocked at 6;

Fig. 3 is a plan view of the finish ring and its locking mechanism when between stations 6a and 1 showing the locking mechanism being automatically actuated and nearly ready to assume the locking position for the finish ring holder;

Fig. 4 is a similar plan view showing the finish ring holder at a position between stations 5 and 6 where the latch means has just been released and the finish ring is beginning to be opened;

Fig. 5 is a similar view of the mold holder at a position between stations 5 and 6 showing the latch mechanism about to engage its cam for being released;

Fig. 6 is a similar view after some further rotation of the table of the machine showing the mold holder latch means being released;

Fig. 7 is a similar view showing the blow mold holder at station 6 and being opened for the take-out after having been unlatched;

Fig. 8 is a vertical sectional view on the line 8—8 of Fig. 2 showing the augmenting means for the finish ring holder locking means; and Fig. 9 is a similar vertical sectional view on the line 9—9 of Fig. 2 showing the augmenting means for the mold holder locking means.

On the accompanying drawings I have used the reference numeral 10 to indicate the base of a glassware forming machine on which a table 12 is mounted for intermittent rotary motion such as shown in the Miller Patent No. 2,062,522 of December 1, 1936 on a Press and Blow Machine. The machine disclosed has 12 stations numbered 1 to 6 and 1a to 6a. A complete glassware forming and removing operation is performed in each 180° of rotation of the table 10 and all of the stations and the corresponding operations thereat are listed below:

1 and 1a: The parison mold is raised from a lower level to an upper lever and is charged with a gob of glass.

2 and 2a: The parison is pressed to shape in the parison mold.

3 and 3a: Transfer occurs (the parison mold is lowered leaving the parison suspended by the finish ring, the finish mold bottom member is pulled radially into position to register with the blow mold and the blow mold is closed around the parison). The blow mold is a two-part mold. Also, at these stations cooling air is supplied for cooling the finish of the ware.

4 and 4a, and 5 and 5a: Each piece of ware is blown at two stations to its final shape in the blow mold.

6 and 6a: The take-out moves radially inward and its take-out tongs engage the ware for removing it from the blow mold whereupon the blow mold is opened and the take-out carries the ware radially outward to place it on a take-out conveyor leading to an annealing lehr.

The cycle of operations just described is then started over again at stations 1a and 1.

The table 12 is indexed intermittently 1/12 of a turn by a Geneva movement or the like such as ordinarily used in glassware forming machines. While the table is moving, it carries with it the parison molds, the blank molds, the blank mold bottoms and the finish rings etc., and of course there is a complete parison mold, blow mold and finish ring at each of the twelve positions on the table. The finish rings are opened between stations 5a and 6a and between stations 5 and 6. The finish rings are closed between stations 6a and 1, and between stations 6 and 1a. Between stations 2 and 3 and also between 2a and 3a the parison mold is lowered. Between stations 4 and 5 and also between 4a and 5a the blow molds are cooled to properly reduce the temperature of the ware to set it up for the take-out operation. Between stations 6 and 1a, and 6a and 1 the blow mold bottom is pushed radially out of the way so that the parison mold can be raised into position for receiving the charge of glass at stations 1a and 1. The foregoing operations are conventional on a machine of the character disclosed which is usually termed a "press and blow" machine of the motor driven type.

The motor of the present disclosure is shown at 14 in Fig. 1. There is a central column 16 about which the table 12 rotates and a pair of supporting arms 17 extend radially in opposite directions therefrom for supporting the press plunger mechanisms shown generally at 18. The outer ends of these arms are supported by pairs of vertical rods 19 extending up from the base 10.

My invention which will presently be described provides locking means for the mold holders and the finish ring holders, means for augmenting each of the locking means and a means to unlock each locking means. Referring to the legends on Fig. 1, at stations 2 and 2a the locking means for the finish rings are augmented, at stations 4 and 4a the locking means for the blow mold holders is augmented while just after station 5 and just before station 6 (also 5a and 6a) while the table is moving the finish ring holder locking means is unlocked and then the blow mold holder locking means is unlocked respectively. Also, as the finish rings are closed just before stations 1 and 1a the locking means automatically snaps into latched position and at stations 3 and 3a as the blow molds close the locking means for the blow mold holders likewise automatically snaps into latched position as will hereinafter be described.

The type of machine disclosed has a number of pivot pins 20 carried by the table 12 on which are pivoted blow mold holders 21 and 21ª and above them finish ring holders 22 and 22ª which holders are of the split type because they are for holding split blow molds and split finish rings. Describing first one of the finish ring holders 22—22ª, the part 22ª has an ear 24 thereon carrying a latch pivot 26 on which is pivoted a latch 28. The latch 28 is provided with a latch hook 30 adapted to coact with a latch hook shoulder 32 of the holder 22. The coaction of 30 and 32 is normally effected by a spring 34. The latch 28 is provided with a cam roller 36, the purpose of which will hereinafter appear. The finish ring itself is shown at 23—23ª and in Fig. 9 the blow mold is shown in dot-and-dash lines at 25.

Cylinder supports 38 are provided at stations 2 and 2a and in turn are supported on the vertical rods 19 by the use of clamp caps 40 in an obvious manner as shown in Fig. 2.

A means to augment the locking action of the latch 28 is provided in the form of a cylinder 42 having a piston 44 therein and associated mechanism which will now be described. A piston rod 46 extends from the piston 44 and has a collar 48 thereon beyond which there is a shoe 50 adapted to alternately press against and retract from the latch 28, the pressing action being shown at station 2 in Fig. 2. This pressing action, of course, is effected by extending the shoe 50. Air connections 52 and 54 are provided for the reception of air from the glassware machine timer at the appropriate times for respectively pressing and retracting the shoe 50 in relation to the latch 28.

I show diagrammatically in Fig. 2 the usual method for opening the finish ring 22—22ª consisting of a pair of links 56 operatively connected with a roller 58 traveling in a cam groove 60.

At station 4 in Fig. 2, I show locking means similar to that already described in connection with the finish ring holders 22—22ª and the locking means in this instance is for the blow mold holder 21—21ª. It consists of an ear 64 on the mold holder 21ª carrying a latch pivot 66 on which is pivoted a latch 68 having a latch hook 70. The latch hook 70 is adapted to coact at times with a latch hook shoulder 72 of the blow mold holder 21 and the latch is normally in the engaged or latched position under the action of a spring 74. The latch 68 carries a cam roller 76 for unlocking the latch as will hereinafter be described.

A cylinder support 78 is suitably mounted on the base 10 and a cylinder 82ª is carried thereby having therein a piston 84. A piston rod 86 extends from the piston 84 radially toward the center of the glassware forming machine and terminates in a shoe 90 adapted to alternately press against and retract from the latch 68. Air connections 92 and 94 are provided for actuating the piston 84 relative to the cylinder 82ª to respectively engage and press the shoe 90 against the latch 68 and retract the shoe therefrom, all at station 4 of the machine.

Adjacent station 5 there is a cam support 62 on the base 10 on which is adjustably mounted a cam bracket 80 having a cam track 82 at such elevation as to coact with only the roller 36 of the finish ring holder latch 28. A second cam bracket 96 is mounted on the cam support 62 and carries a pin 98 on which is pivoted a cam member 100 having a cam track 102 at a lower elevation than the cam track 82 so that it will coact with only the cam roller 76 of the blow mold holder latch 68. The relative elevations are shown by the positions of the rollers 36 and 76 in Fig. 9. The cam member 100 has a stop lug 104 adapted to coact with a pair of stop screws 106 and 108, being normally engaged with the stop screw 108 by a spring 110 as shown in Figs. 5 and 7. In Figs. 2 and 6 (and dotted in Fig. 7) it is shown engaged with the stop screw 106 as a result of coaction between the cam roller 76 when at station 6 and the cam track 102 of the cam member 100.

At station 6 the blow mold holders 21 and 21ª are opened by links shown diagrammatically at 114. A piston 118 reciprocable within a cylinder 120 is provided for each of the twelve blow molds for pulling the links to open the holders and pushing the links to close the holders at the proper times. The links 114 are operably connected with a piston rod 116 extending from the piston 118. The cylinder 120 has a pneumatic line 122 for mold opening purposes and a pneumatic line 124 for mold closing purposes when compressed air from the machine timer is supplied to these lines at the proper time. In Fig. 1, the usual take-out 112 is shown at stations 6 and 6a.

*Practical operation*

In the operation of my mold holder and finish ring holder locking means, the cycle may be considered as starting between stations 6a and 1 as shown in Fig. 3. The cam 60 is coacting with the roller 58 to push on the links 56 for closing the finish ring carriers 22 and 22ª and they are illustrated nearly closed as they approach station 1 with the latch 28 being forced outwardly by the latch hook shoulder 32 and about ready to drop in behind the shoulder. Just before station 1 is reached, the hook does drop in behind the shoulder and this shoulder is on a slight incline with respect to a circumferential line having the pivot 26 as its center so that the action of the spring 34 is to draw the holders 22 and 22ª toward each other as the latch hook 30 rides inward on the shoulder 32.

The latch 28 under the action of the spring 34 is sufficient to keep the finish ring holder 22—22ª and thereby the finish ring 23—23ª properly closed at station 1 while the charge of glass is dropped into the parison mold which is raised into proper position at station 1.

At station 2 the press plunger is lowered through the neck ring 23—23ª and enter the parison mold to form the parison therein. It is during the press operation that it is desirable to augment the locking pressure of the finish ring locking means and this is accomplished by the introduction of compressed air through the air connection 52 of the cylinder 42 of Fig. 8 behind the piston 44 for urging the shoe 50 into pressing engagement with the latch 28. This is also shown in Fig. 2. The plunger remains in the press position for a dwell period and when the plunger is raised the shoe 50 is retracted from engagement with the latch by the introduction of air into the connection 54 of the cylinder 42 in proper timed relation so that the table 12 is then ready to index to the transfer station 3.

During the indexing period the parison mold is lowered away from the parison which is now suspended by the finish ring 23—23ª and at station 3 the blow mold carried by the holders 21 and 21ª is closed by the introduction of air at 124 into the cylinder 120 after the bottom for the blow mold has been pulled into a position of registry with the blow mold. The blow mold is now ready to be indexed to station 4 where pressure on the latch 68 (which was latched at station 3 by closure of the blow mold) is augmented by the shoe 90. Introducing air in the connection 92 accomplishes this operation.

The augmenting means is held during the blow period at station 4 and then released just before the table indexes for the blow mold to move to station 5 where the finish blow takes place, but since the glass is partially set up at this time it is unnecessary to augment the latch 68 which at station 4 was pressed well "home" by the shoe 90.

It will be noted that the latch 28 for the finish ring 23—23a is at station 5 in a position ready to be engaged by the cam track 82 so that when the table indexes and the latch roller 36 is carried along the cam track 82 as in Fig. 4, it releases the latch, and the cam track cam groove 60 begins to act on the roller 58 for pulling on the links 56 and thereby opening the finish ring 23—23a so that the take-out tongs can come in at station 6 and engage the ware by the finish for removing it from the blow mold. Fig. 5 illustrates the blow mold carriers 21 and 21a nearly at station 6 and the roller 76 of the latch 68 just beginning to engage the cam member 100 for swinging its stop lug 104 away from the stop screw 108 whereas some further movement results in the position illustrated in Fig. 6 with the hook 70 of the latch 68 just beginning to release its coacting latch hook shoulder 72. Just before the holders 21 and 21a come into station 6 the latch 68 is fully released (while the cam member 100 is still in the dash-line position of Fig. 7) and then the cam member moves to the full line position under the action of the spring 110 so that it is out of the way for the take-out mechanism 112 to move into take-out position and back again with the finished ware.

Now that the latch 68 has geen released, the blow mold holders 21 and 21a may be opened and in Fig. 7 have been opened slightly by the pulling action on the links 114 caused by introduction of air at 122 into the cylinder 120 of Fig. 2. This opening of the blow mold, of course, is delayed until after the take-out tongs engage the finish of the ware, so that when the mold is opened the take-out tongs support the ware and may carry it to the take-out conveyor. The holders 21 and 21a then remain open until they are closed again at station 3a.

My disclosed holder locking means provides a simple spring actuated latch means for initially locking the finish ring holders and the blow mold holders closed, and a means to augment the locking pressure in each case at a time when such means is needed (during the press and the initial blow periods). The augmenting means is comparatively simple consisting merely of pneumatically operated shoes provided at only two stations of the machine for each piece of ware formed therein. The latches 28 and 68 may be made quite rugged to accomplish considerable holding force particularly when augmented by the action of the shoes 50 and 90 and by properly inclining the latch hook shoulders 32 and 72, considerable purchase on the holding action is secured. Also, this results in a wedging action at station 4 when the shoe 90 engages the latch 68, sufficient to keep this latch well engaged for the blow operation at station 5, and this is likewise true of the action of the shoe 50 on the latch 28 at station 2 which latch is kept in engagement through stations 3, 4 and 5 before release just after station 5 as shown in Fig. 4. My arrangement eliminates the necessity of toggle link holding devices such as shown in Lynch et al., Patent No. 1,788,312 and Bridges Patent No. 2,069,130, and is considerably simpler in construction and operation than the devices shown in those patents.

Some changes may be made in the construction and arrangement of the parts of my mold holder and finish ring holder locking means without departing from the real spirit and purpose of my invention. It is, therefore, my intention to cover by my claims any modified forms of structure or use of mechanical equivalents as may reasonably be included with their scope.

I claim as my invention:

1. Holder locking means for a glassware forming machine having an intermittently indexed turret and two-part holders carried sequentially thereby to a station of the machine, and means for closing and opening said holders; comprising a hook-like latch pivoted to one part of each holder, a shoulder on the other part of each holder for coaction with the hook of the latch to latch the holder in closed position, means located at said station for pressure engagement with said latches successively as said holders come into said station and power means for rendering said last means operable to engage and then exert pressure on said latches when stationary at said station, said power means successively moving said last means out of engagement with said latches before they move from said station.

2. Mold holder and finish ring holder locking means for a glassware forming machine having an intermittently indexed turret and two-part holders carried sequentially thereby to a station of the machine, and means for closing and opening said holders; comprising a hook-like spring latch pivoted to one part of each holder, a shoulder on the other part of each holder for coaction with the hook of the latch to latch the holders in closed position, projectable means located at said station for successively engaging said spring latches and then augmenting the pressure exerted thereby on their respective molds, power means for rendering said augmenting means operable, and stationary cam means located at another station of the glassware forming machine for engaging and positively releasing said spring latches.

3. Holder locking means for a glassware forming machine having an intermittently indexed turret and two-part holders carried sequentially thereby to a station of the machine, and means for closing and opening said holders; comprising a hook-like latch pivoted to one part of each holder, a shoulder on the other part of each holder for coaction with the hook of the latch to latch the holder in closed position, extendable means located at said station for pressing against said latches successively, power means for rendering said last means operable to engage and then exert pressure on said latches when at said station, and stationary cam means located at another station of the glassware forming machine for engaging and thereby opening said spring latches as they pass said cam means.

4. In mold holder and finish ring holder locking means for a glassware forming machine having an intermittently indexed turret and two-part holders carried sequentially thereby to a station of the machine, and means for closing and opening said holders; a spring latch pivoted to one part of each mold holder and each finish ring holder, a shoulder on the other part of each of said holders for coaction with said latch to latch the holders in closed position as they are being closed, power actuated means located at said station for successively engaging said spring latches as they dwell at said station and thereupon augmenting their pressure, and cam means located at another station of the glassware forming machine for opening said spring latches as said holders are moved past said cam means.

5. Mold holder and finish ring holder locking means for a glassware forming machine having two-part holders, and means for closing and opening said holders; comprising a hook-like spring latch pivoted to one part of each holder, a shoulder on the other part of each holder for coaction with the hook of the latch to latch the holders in closed position, means at predetermined stations of the glassware forming machine for augmenting the pressure exerted by said spring latches, power means for rendering said augmenting means operable, stationary cam means at other predetermined stations of the glassware forming machine for releasing said spring latches, one of said cam means being pivotally mounted and biased to an out-of-the-way position to accommodate a movable take-out mechanism, said latches engaging said one of said cam means to move it against its bias to latch releasing position whereupon said one of said cam means is released by the latch to return to its out-of-the-way position.

6. In mold holder and finish ring holder locking means for a glassware forming machine having two-part blow mold holders and two-part finish ring holders, and means for closing and opening said holders; a hook-like spring latch pivoted to one part of each blow mold holder and to one part of each finish ring holder, a shoulder on the other part of each blow mold holder and each finish ring holder for coaction with the respective hooks of the latches thereof to latch the holders in closed position, means at a press station of the glassware forming machine for augmenting the pressure exerted by said spring latch of said finish ring holder, means at a blow station of the glassware forming machine for augmenting the pressure exerted by said spring latch of said blow mold holder, means for rendering each of said augmenting means operable when the finish ring holders and blow mold holders are at said press and blow stations respectively, stationary cam means adjacent a second blow station of the glassware forming machine for unlatching said finish ring holder latch, and stationary cam means adjacent a take-out station of the glassware forming machine for unlatching said blow mold holder latch, said last cam means being pivotally mounted and normally spring held in a position to clear a take-out mechanism operable at the take-out station of the glassware forming machine and returnable to said position after unlatching said blow mold holder latch.

7. In mold holder and finish ring holder locking means for a glassware forming machine having two-part blow mold holders and two-part finish ring holders, and means for closing and opening said holders; a hook-like spring latch pivoted to one part of each blow mold holder and to one part of each finish ring holder, a shoulder on the other part of each blow mold holder and each finish ring holder for coaction with the respective hooks of the latches thereof to latch the holders in closed position, means at a press station of the glassware forming machine for augmenting the pressure exerted by said spring latch of said finish ring holder, means at a blow station of the glassware forming machine for augmenting the pressure exerted by said spring latch of said blow mold holder, means for rendering each of said augmenting means operable when the finish ring holders and blow mold holders are at said press and blow stations respectively, stationary cam means adjacent a second blow station of the glassware forming machine for unlatching said finish ring holder latch, and stationary cam means adjacent a take-out station of the glassware forming machine for unlatching said blow mold holder latch.

8. In holder locking means for a glassware forming machine having two-part holders, and means for closing and opening said holders; a hook-like latch pivoted to one part of each holder, a shoulder on the other part of each holder for coaction with the respective hooks of the latches thereof to latch the holders in closed position, means at a station of the glassware forming machine for augmenting the pressure exerted by said latches on said holders, means for rendering said augmenting means operable when the holders are at said station, and stationary cam means at a second station of the glassware forming machine for unlatching said latches, said cam means being pivotally mounted and normally spring held in an out-of-the-way position to clear the take-out mechanism operable adjacent the take-out station of the glassware forming machine, and returnable to said out-of-the-way position after unlatching said latches as they approach the take-out station.

9. In mold holder and finish ring holder locking means for a glassware forming machine having two-part mold holders and two-part finish ring holders, and means for closing and opening said holders; a latch pivoted to one part of each mold holder and to one part of each finish ring holder, a shoulder on the other part of each mold holder and each finish ring holder for coaction with the respective latches to latch the holders in closed position, means located at a press station of the glassware forming machine for successively engaging said latches of said finish ring holders and augmenting their pressures, means located at a blow station of the glassware forming machine for successively engaging said latches of said mold holders and augmenting their pressures, and means for rendering each of said augmenting means operable only when a finish ring holder and a mold holder are at said press and blow stations respectively.

10. In mold holder and finish ring holder locking means for a glassware forming machine having two-part mold holders and two-part finish ring holders, and means for closing and opening said holders; a latch pivoted to one part of each mold holder and to one part of each finish ring holder, a shoulder on the other part of each mold holder and each finish ring holder for coaction with the respective latches to latch the holders in closed position, means located at a press station of the glassware forming machine for successively engaging said latches of said finish ring holders and augmenting their pressures, means located at a blow station of the glassware forming machine for successively engaging said latches of said mold holders and augmenting their pressures, means for rendering each of said augmenting means operable only when a finish ring holder and a mold holder are at said press and blow stations respectively, stationary cam means located at a second blow station of the glassware forming machine for successively unlatching said finish ring holder latches, and stationary cam means at a take-out station thereof for successively unlatching said mold holder latches.

11. In mold holder and finish ring holder locking means for a glassware forming machine having two-part mold holders and two-part finish ring holders, and means for closing and opening said holders; a latch pivoted to one part of each mold holder and to one part of each finish ring holder, a shoulder on the other part of each mold holder and each finish ring holder for coaction with the respective latches to latch the holders in closed position, means at a press station of the glassware forming machine for augmenting the pressure exerted by said latch of said finish ring holder, means at a blow station of the glassware forming machine for augmenting the pressure exerted by said latch of said mold holder, means for rendering each of said augmenting means operable when the finish ring holders and mold holders are at said press and blow stations respectively, stationary cam means at a second blow station of the glassware forming machine for unlatching said finish ring holder latch, and stationary cam means at a take-out station thereof for unlatching said mold holder latch, said last cam means being pivotally mounted and normally spring held in a position to clear the take-out mechanism operable at the take-out station of the glassware forming machine and returnable to said position after unlatching said mold holder latch whereby to clear the way for the take-out mechanism.

References Cited in the file of this patent
UNITED STATES PATENTS

| | | |
|---|---|---|
| 900,037 | Pierpont | Sept. 29, 1908 |
| 1,049,594 | Olsen | Jan. 7, 1913 |
| 1,529,661 | Miller | Mar. 17, 1925 |
| 1,601,836 | Stenhouse | Oct. 5, 1926 |
| 2,357,501 | Carnahan | Sept. 5, 1945 |